United States Patent [19]

Yamaguchi et al.

[11] 3,970,049
[45] July 20, 1976

[54] IGNITION SYSTEM FOR ROTARY PISTON ENGINE

[75] Inventors: Shunzo Yamaguchi, Nishio; Toshihiko Igashira, Toyokawa; Masami Hujita, Okazaki, all of Japan

[73] Assignee: Nippon Soken, Inc., Nishio, Japan

[22] Filed: June 4, 1974

[21] Appl. No.: 476,273

[30] Foreign Application Priority Data
June 5, 1973  Japan.......................... 48-66701[U]
June 7, 1973  Japan.......................... 48-67229[U]

[52] U.S. Cl.............................. 123/8.05; 123/8.09; 123/8.45; 123/148 DS
[51] Int. Cl.² ........................................ F02B 53/04
[58] Field of Search.................. 123/8.09, 8.05, 8.07, 123/8.45, 148 DS

[56] References Cited
UNITED STATES PATENTS

| | | | |
|---|---|---|---|
| 3,534,717 | 10/1970 | Froede | 123/8.05 |
| 3,584,608 | 6/1971 | Shibagaki | 123/8.09 |
| 3,626,909 | 12/1971 | Hayashida | 123/8.05 |
| 3,685,295 | 8/1972 | Tatsutomi | 123/148 DS |
| 3,752,128 | 8/1973 | Tatsutomi | 123/8.09 |
| 3,809,042 | 5/1974 | Hosho | 123/148 DS |

*Primary Examiner*—Clarence R. Gordon
*Attorney, Agent, or Firm*—Cushman, Darby & Cushman

[57] ABSTRACT

There is provided an ignition system for a rotary piston engine comprising first and second ignition means mounted in a rotor housing. The first ignition means is positioned ahead of the second ignition means in the direction of rotation of a rotor. Switching means is actuated in response to the output signal of an engine speed sensor and an intake manifold vacuum sensor so that current is supplied to the second ignition means only during specified periods such as during the high engine speed operation and high engine load operation.

4 Claims, 6 Drawing Figures

IGNITION SYSTEM FOR ROTARY PISTON ENGINE

BACKGROUND OF THE INVENTION

1. Field of the Invention

The present invention relates to an improved ignition system for a rotary piston engine.

2. Description of the Prior Art

Rotary piston engines are known in the art in which in order to reduce HC (hydrocarbons) and NOx (nitrogen oxides) emissions, a spark plug is provided so that it is located at the forward end of the combustion chamber when the rotor is at the top dead center. A disadvantage of the rotary piston engine of this construction is that at high engine speeds, the propagation of flame is difficult thereby rapidly increasing the HC emissions. Further it is impossible to advance the ignition timing and hence it is impossible to obtain a high power output.

SUMMARY OF THE INVENTION

It is an object of the present invention to provide an improved ignition system for a rotary piston engine comprising first sparking means mounted in the vicinity of the forward end of a combustion chamber in the direction of rotation of a rotor when it is at the top dead center, second sparking means mounted at a position located behind the first sparking means (on the back side in the direction of the rotation of the rotor) and providing a good degree of spark advance, and a change-over switch operable upon receipt of the output signal of a sensor for detecting the rotational speed of the engine and a sensor for detecting the manifold vacuum, whereby when the engine goes into high speed operation and/or when the engine is under high load operating conditions current is supplied only to the second sparking means, while in other circumstances current is supplied only to the first sparking means, thereby ensuring at the high engine speeds an improved flame propagation to reduce HC emissions and making it possible to advance the ignition timing to ensure an increased output at the high loads.

The system according to the invention has among its great advantages the fact that at high engine speeds the ignition timing is advanced to ensure an improved flame propagation to reduce HC emissions, and at high loads the ignition timing is also advanced to provide an increased output, while in other circumstances the ignition is accomplished by the first sparking means to effectively reduce HC and NOx emissions.

DESCRIPTION OF THE PREFERRED EMBODIMENTS

The present invention will now be described in greater detail with reference to the illustrated embodiments.

Figure 1:
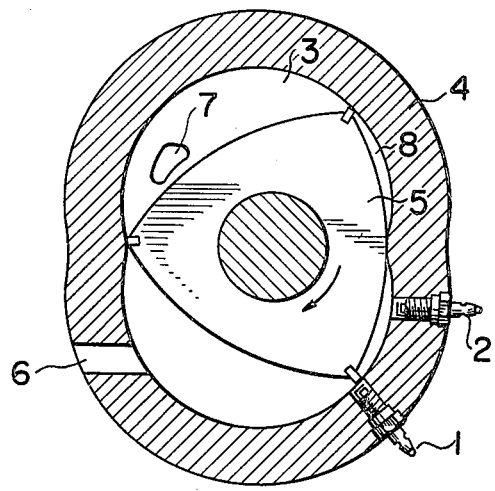
FIG. 1 is a schematic sectional view of a rotary piston engine incorporating the improved ignition system according to the present invention.
Figure 2:
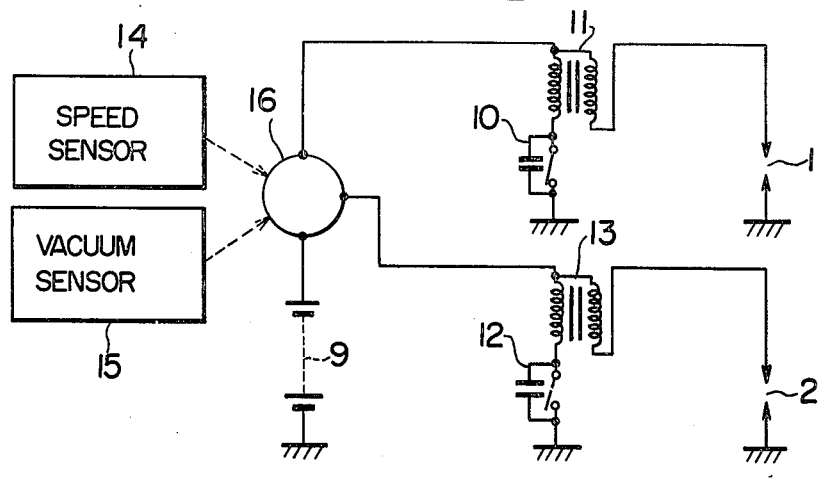
FIG. 2 is a schematic diagram showing an embodiment of the ignition system according to the invention.

Referring first to FIG. 1 showing a rotary piston engine equipped with an ignition system according to a first embodiment of the present invention, numeral 3 designates a side housing, 5 a rotor kept in contact with the walls of rotor housing 4 and adapted to rotate eccentrically in the housing while forming the working chambers where the intake, compression, power and exhaust strokes take place, 6 an exhaust port, 7 an intake port. In the conditions of FIG. 1, the rotor 5 is at the top dead center and a working chamber 8 constitutes a combustion chamber. A first spark plug 1 is mounted in the vicinity of the forward end of the combustion chamber in the direction of rotation of the rotor, and a second spark plug 2 is mounted on the back side of the first spark plug 1 in the direction of the rotation of the rotor. In FIG. 2, there is illustrated a schematic diagram of the ignition system according to the first embodiment. The first spark plug 1 is supplied with a high voltage from a battery 9, a breaker 10 and an ignition coil 11 to provide a spark. The second spark plug 2 is supplied with a high voltage from the battery 9, a breaker 12 and an ignition coil 13. Numeral 14 designates a speed sensor for detecting the number of revolutions of an engine, 15 a vacuum sensor for detecting the vacuum within the engine intake manifold. Numeral 16 designates a change-over switch for receiving the output signal of the sensors 14 and 15 to selectively supply power from the battery 9 to either one of the first and second spark plugs 1 and 2.

With the construction described above, the operation of the first embodiment is as follows. Under normal operating conditions, the engine is operated using the first spark plug 1 alone and power is supplied to the first spark plug 1 from the battery 9 through the change-over switch 16, the breaker 10 and the ignition coil 11. However, when the engine load increases so that the manifold vacuum decreases, the vacuum sensor 15 produces a signal and actuates the change-over switch 16. Consequently, the voltage from the battery 9 is supplied to the second spark plug 2 through the breaker 12 and the ignition coil 13 and the engine is operated using the second spark plug 2. When the engine load decreases so that the manifold vacuum increases, the vacuum sensor 15 similarly generates a signal and the change-over switch 19 is actuated to supply the power to the first spark plug 1. On the other hand, when the number of revolutions of the engine increases, the speed sensor 14 generates a signal so that the change-over switch 19 comes into operation and supplies the power to the second spark plug 2. When the engine speed decreases, the speed sensor 14 similarly generates a signal and the change-over switch 19 is actuated to supply the power to the first spark plug 1.

Figure 3:
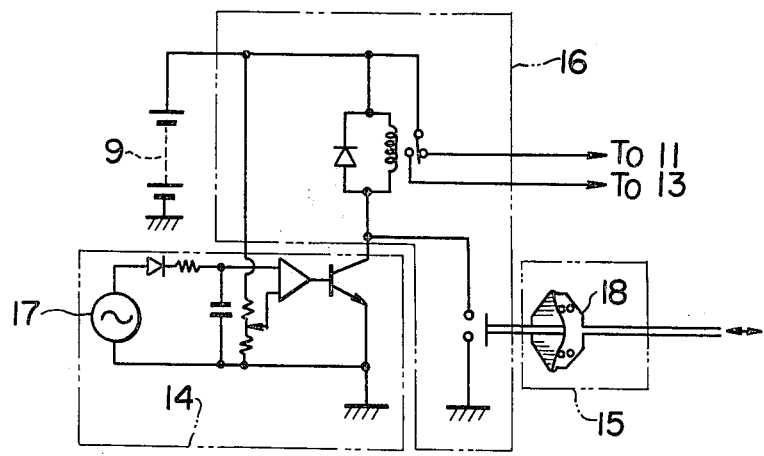
FIG. 3 is a circuit diagram showing the principal part of the embodiment shown in FIG. 2.

FIG. 3 is a wiring diagram showing an exemplary form of the speed sensor 14, the vacuum sensor 15 and the change-over switch 16. In FIG. 3, numeral 17 designates a generator driven from the output shaft of the engine, whereby the output voltage of the generator 17 is compared with a preset voltage to turn a transistor on and off and the electromagnetic solenoid of the change-over switch 19 is energized and deenergized thereby to switch the supply of power between the first and second spark plugs 1 and 2. Numeral 18 designates a diaphragm actuator into which the engine manifold vacuum is introduced, whereby when the manifold vacuum is low, e.g., during the acceleration and high load operation, the electromagnetic soleniod of the change-over switch 19 is energized to supply the power to the second spark plug 2.

Figure 4:
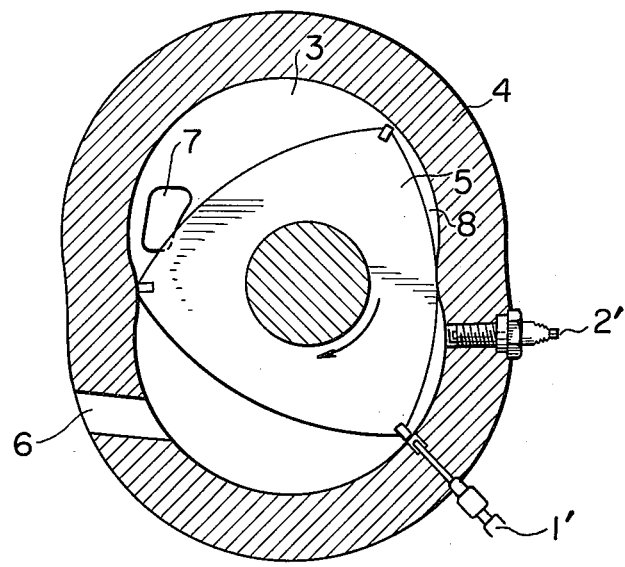
FIG. 4 is a schematic sectional view of a rotary piston engine incorporating an ignition system according to a second embodiment.

Next, a second embodiment of this invention will be described. Referring to FIG. 4, there is illustrated a schematic sectional view of a rotary piston engine incorporating the ignition system according to the second embodiment which is identical with the first embodiment of FIG. 1 except that the first sparking means is comprised of a glow plug. In the second embodiment in which the like reference numerals as used in FIG. 1 designate the like elements, a glow plug 1' is mounted in the vicinity of the forward end of the combustion chamber 8 in the direction of rotation of the rotor, and a second spark plug 2' is mounted on the back side of the first plug 1' relative to the direction of rotation of the rotor.

Figure 5:
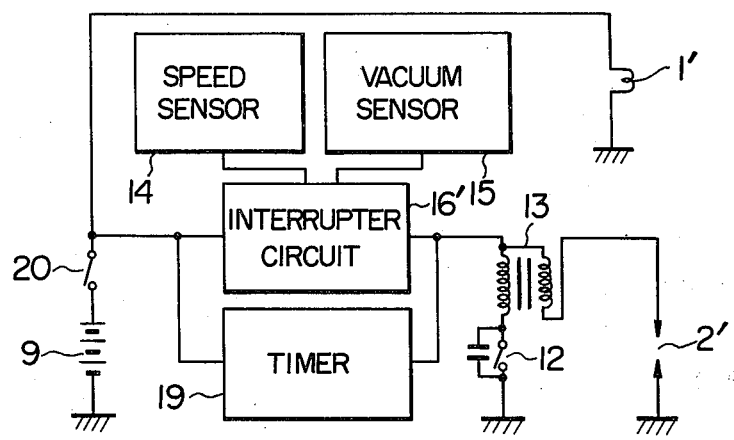
FIG. 5 is a schematic diagram of the second embodiment of the invention.

FIG. 5 illustrates a schematic diagram of the ignition system according to the second embodiment. The glow plug 1' is supplied with power from the battery 9 so that it is heated red-hot and ignites the fuel mixture. On the other hand, a high voltage is supplied to the spark plug 2' from the battery 9 through the breaker 12 and the ignition coil 13 to provide a spark that ignites the fuel mixture. Numeral 14 designates a speed sensor for detecting the number of revolutions of the engine, 15 a vacuum sensor for detecting the vacuum within the intake manifold. Numeral 16' designates an interrupter circuit which receives the signal from the sensors 14 and 15 to open and close the circuit, 19 a timer which is turned on by the closing of a key switch 20 and which is turned off at the expiration of a predetermined time.

With the construction described above, the operation of the second embodiment is as follows. When the key switch 20 is closed, the power from the battery 9 is supplied to the glow plug 1' and the power supply is continued until the key switch 20 is opened. On the other hand, the closing of the key switch 20 switches the timer 19 on, so that power is supplied to the spark plug 2' for a predetermined period of time until the glow plug 1' is heated red-hot after which the timer 19 is turned off. With the engine being operated using the glow plug 1' alone, when the engine load increases so that the intake manifold vacuum decreases, the vacuum sensor 15 generates a signal and the interrupter circuit 16' is actuated. Consequently, power is supplied to the spark plug 2' and the ignition timing is advanced to produce an increased output. When the engine load decreases so that the manifold vacuum increases, the vacuum sensor 15 similarly generates a signal so that the interrupter circuit 16' is cut out of action and the supply of the power to the spark plug 2' is terminated. On the other hand, when the number of revolutions of the engine increases, the speed sensor 14 generates a signal so that the interrupter circuit 16' is actuated and power is supplied to the spark plug 2', thereby advancing the ignition timing and reducing HC emissions. When the engine speed decreases, the speed sensor 14 similarly generates a signal so that the interrupter circuit 16' is cut out of action and the supply of the power to the spark plug 2' is stopped.

Figure 6:
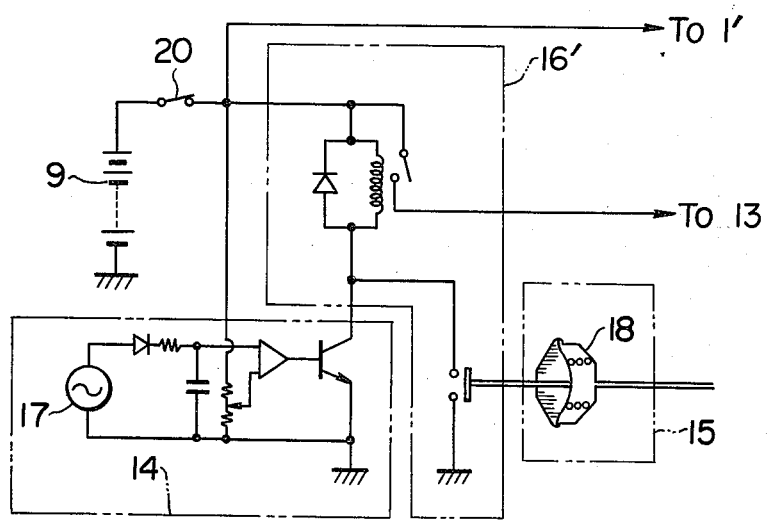
FIG. 6 is a circuit diagram showing a principal part of the second embodiment shown in FIG. 5.

FIG. 6 illustrates a circuit diagram showing an exemplary form of the speed sensor 14, the vacuum sensor 15 and the interrupter circuit 16'. In FIG. 6, numeral 17 designates a generator driven from the output shaft of the engine, and the output voltage of the generator 17 is compared with a preset voltage so that a transistor is turned on and off and the electromagnetic solenoid of the interrupter circuit 16' is energized and deenergized to switch on and off the current to the ignition coil 13. Numeral 18 designates a diaphragm actuator operated by the manifold vacuum and it also switches on and off the current to the ignition coil 13.

While only a few embodiments have been described in detail hereinabove, those skilled in the art will readily appreciate that many modifications of the invention may be made without departing from the scope and spirit of the invention. For instance, the requirements for supplying current to a spark plug differ for different specifications of engines, and it is possible to arrange so that the power is supplied to the spark plug only when it is desired to reduce the content of harmful substances in the exhaust gases under engine operating conditions other than those described hereinabove or when it is desired to provide an increased output during the high power operation, e.g., when it is desired to produce a high power for a short period of time during intermediate speed operation of the engine.

What is claimed is:

1. An ignition system for a rotary piston engine comprising:
   a rotor;
   a rotor housing in which said rotor is mounted to contact with the walls thereof;
   first and second sparking means, said first sparking means being positioned in said rotor housing proximate a forward end of a combustion chamber in the direction of rotation of said rotor wherein the combustion chamber is defined by said rotor and said rotor housing when said rotor is at a top dead center, said second sparking means being positioned in said rotor housing at the rear of the position of said first sparking means relative to said combustion chamber in the direction of rotation of said rotor, both said first and second sparking means being positioned on a forward side of the short axis of said rotor housing in the direction of rotation of said rotor;
   a speed sensor for detecting the rotational speed of said engine;
   a vacuum sensor for detecting the vacuum in the intake manifold of said engine; and
   switching means responsive to the output of said speed sensor and said vacuum sensor for coupling current to said second sparking means only when said engine goes into high speed operation and/or high load operation, and for coupling current to only said first sparking means under other conditions of said engine.

2. A system according to claim 1, wherein said first sparking means is comprised of a first spark plug, said second sparking means is comprised of a second spark plug, and said switching means is comprised of a change-over switch whereby current is supplied only to said second spark plug under high speed and/or high load operating conditions of said engine, whereas current is supplied only to said first spark plug under other operating conitions of said engine.

3. An ignition system for a rotary piston engine comprising:
   a rotor;

a rotor housing in which said rotor is mounted to contact with the walls thereof;

first and second sparking means, said first sparking means being a glow plug positioned in said rotor housing proximate a forward end of a combustion chamber in the direction of rotation of said rotor wherein the combustion chamber is defined by said rotor and said rotor housing when said rotor is at a top dead center, said second sparking means being a spark plug positioned in said rotor housing at the rear of the position of said first sparking means relative to said combustion chamber in the direction of rotation of said rotor;

a speed sensor for detecting the rotational speed of said engine;

a vacuum sensor for detecting the vacuum in the intake manifold of said engine;

switching means responsive to the output of said speed sensor and said vacuum sensor for coupling current to said second sparking means only when said engine goes into high speed operation and/or high load operation, and for coupling current to only said first sparking means under other conditions of said engine; and means for coupling current to said spark plug for a predetermined period of time after said engine is started.

4. An ignition system for a rotary piston engine comprising:

a rotor;

a rotor housing in which said rotor is mounted to contact with the walls thereof;

first and second sparking means, said first sparking means being a glow plug positioned in said rotor housing proximate a forward end of a combustion chamber in the direction of rotation of said rotor wherein the combustion chamber is defined by said rotor and said rotor housing when said rotor is at a top dead center, said second sparking means being a spark plug positioned in said rotor housing at the rear of the position of said glow plug relative to said combustion chamber in the direction of rotation of said rotor, both said glow plug and said spark plug being positioned on a forward side of the short axis of said rotor housing in the direction of rotation of said rotor;

a speed sensor for detecting the rotational speed of said engine;

a vacuum sensor for detecting the vacuum in the intake manifold of said engine;

switching means responsive to the output of said speed sensor and said vacuum sensor for coupling current to said spark plug only when said engine goes into high speed operation and/or high load operation, and for coupling current to only said glow plug under other conditions of said engine; and means for coupling current to said spark plug for a predetermined period of time after said engine is started.

* * * * *